R. R. RUST.
PIPE JOINT.
APPLICATION FILED APR. 12, 1909.
935,412.
Patented Sept. 28, 1909.
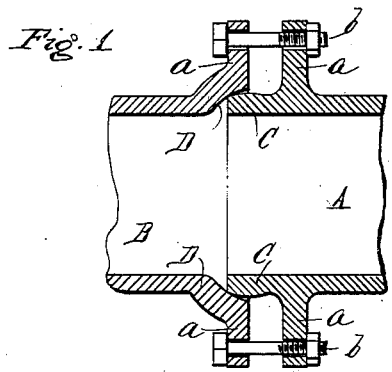
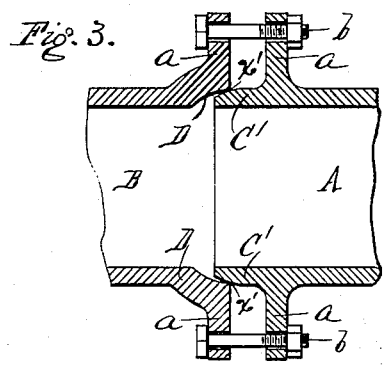
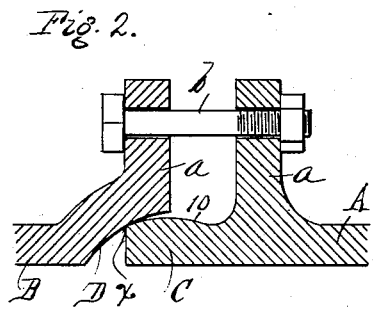
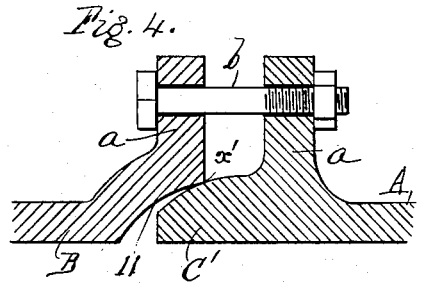
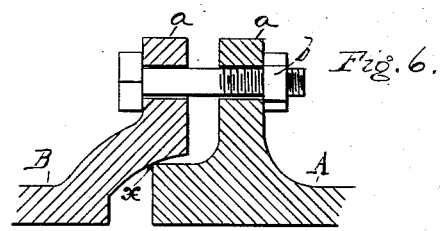
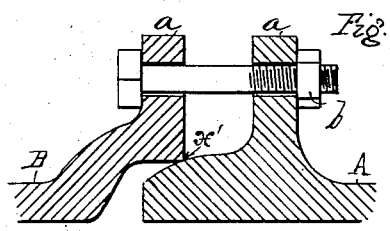
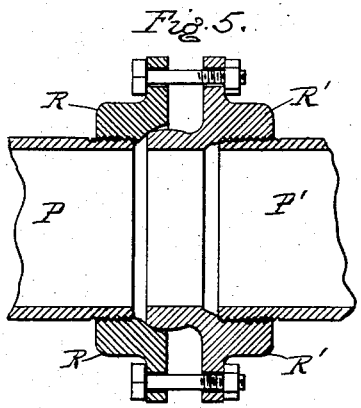
WITNESSES
L. H. Grote
W. E. Keir
INVENTOR
Robert R. Rust
BY
Howson and Howson
ATTORNEYS

UNITED STATES PATENT OFFICE.

ROBERT R. RUST, OF NEW YORK, N. Y.

PIPE-JOINT.

935,412.

Specification of Letters Patent. Patented Sept. 28, 1909.

Application filed April 12, 1909. Serial No. 489,344.

*To all whom it may concern:*

Be it known that I, ROBERT R. RUST, a citizen of the United States of America, residing in the borough of Manhattan, in the city, county, and State of New York, have invented certain new and useful Improvements in Pipe-Joints, of which the following is a specification.

My invention relates to the construction of joints for cast iron and other pipes and the like, and my invention is especially useful where allowances have to be made for laying the pipe lengths somewhat out of alinement with each other.

As a rule some well known form of ball joint or special bent sections or elbow joints were formerly necessary to be used where successive pipe lengths had to be laid out of alinement with each other, but special sections or elbow joints, besides being expensive, were not satisfactory because not adapted for all the varying angles which might be required, and on the other hand, ball joints are always difficult to make and maintain tight without packing, because of the difficulty of fitting accurately the extensive surface presented by the machined faces of a ball joint. It has been attempted to meet these difficulties by providing pipe ends with straight tapering male and female ends, the tapers of the matching ends being different, so that when those two ends are brought together, only a comparatively short part of these two tapering surfaces will be in contact with each other. Because of the elasticity of the metal composing such a joint and because of the very considerable compression obtained by means of these slight tapers, it was possible by such a construction to obtain a considerable deflection from a straight line in the axes of successive pipe sections. I have found, however, that the use of these straight tapering surfaces involves considerable danger of fracture at the points of such deflection.

It is the main object of my invention to meet this difficulty, and to provide a joint of greater flexibility while retaining all the advantages of the small surface contact at the joints. For this purpose I provide the meeting end of one of the pipes with a curved surface, while the adjacent end of the next section has an angular edge to ride upon and coöperate with said curved surface, as hereinafter described.

In the accompanying drawings Figure 1 is a sectional view of one form of pipe joint, embodying my invention; Fig. 2 is a section drawn on larger scale of a part of the joint; Fig. 3 is a sectional view of another form of joint; Fig. 4 is a section drawn to a larger scale of a part of the same joint; Figs. 5, 6 and 7 are sectional views of other styles of pipe joints, embodying my invention.

In Figs. 1, 2, 3 and 4, I have shown my invention as applied to a construction of pipe in which collars or lugs $a$, $a$, are formed on the pipe sections for the application thereto of bolts and nuts $b$ to draw the sections together. At one end of one pipe section (A) is formed a projecting end piece C to enter a flaring mouth D on the end of the other section B. The projecting end C is formed with an annular edge and also by preference curved externally, as shown in Fig. 2. The flaring mouth D of the other section B is curved, internally, to receive the projecting end of section A, so that when the bolts and nuts $b$ are applied to draw the two parts together, said angular edge $x$ comes into contact with and rides upon the curved surface of the other part, and in such a way as to permit one pipe section to be laid out of alinement with the other part to a considerable degree, and yet rely on securing a tight joint between the meeting faces.

A construction similar to that described is illustrated in Figs. 3 and 4, except that the projecting part $C^1$ is externally rounded to receive the angular edge $x^1$ of the mouth of the pipe section B.

In Fig. 5 I have shown joint constructions embodying the above described improvement of a curved face on one part combined with an angular edge on the other part, but the joint instead of being formed directly on the pipe sections is formed on coupling rings R, $R^1$, to which the pipe lengths P, $P^1$ are secured by screw threading.

In the constructions so far described, I have shown the surface immediately behind the angular edge as curved. Thus in Fig. 2, the surface 10 behind the edge $x$ is curved, and in Fig. 4, the surface 11 immediately behind the abutting angular edge $x^1$ is curved, and each such curve is eccentric to the curved face with which the angular edge so operates. In the modifications, Figs. 6 and 7, however, I have shown the surfaces immediately behind the angular edges as parallel with the axis of the pipe, thus making the angular edge a little sharper than in the constructions, Figs. 1 to 5.

I claim as my invention—

1. A pipe joint, comprising one member having a curved surface in combination with another member having an angular edge to ride upon and coöperate with the curved surface on said other part.

2. A pipe joint comprising one member having a curved surface in combination with another member having an angular edge with curved surface on said other part, the surface immediately behind said angular edge being curved eccentrically to the curve on the other member.

In testimony whereof I have signed my name to this specification, in the presence of two subscribing witnesses.

ROBERT R. RUST.

Witnesses:
WALTER E. BURGESS,
WILLIAM HALTUS.